United States Patent [19]

Klement

[11] Patent Number: 4,784,044
[45] Date of Patent: Nov. 15, 1988

[54] PRESSURE ACTUATED AXIAL LOCKING

[76] Inventor: Klaus-Dieter Klement, St.-Mauri-Strasse 1, 5170 Juelich, Fed. Rep. of Germany

[21] Appl. No.: 922,192

[22] Filed: Oct. 23, 1986

[30] Foreign Application Priority Data

Oct. 23, 1985 [DE] Fed. Rep. of Germany ....... 3537687

[51] Int. Cl.[4] ............................................. F15B 15/26
[52] U.S. Cl. ........................................ 92/24; 92/23; 92/31; 92/27; 92/28
[58] Field of Search ................... 92/23, 24, 31, 32, 27, 92/28; 279/4, 74, 75; 408/239, 239 A; 409/233, 74, 120, 121

[56] References Cited

U.S. PATENT DOCUMENTS

| 2,741,166 | 3/1955 | Otta ........................................ 279/4 |
| 3,967,830 | 7/1976 | Smith .................................. 408/239 |
| 3,992,019 | 11/1976 | Crawshay ............................ 279/4 |
| 4,537,113 | 8/1985 | Stoll et al. ........................... 92/24 |

FOREIGN PATENT DOCUMENTS

| 2910119 | 9/1980 | Fed. Rep. of Germany . |
| 2911071 | 9/1980 | Fed. Rep. of Germany . |
| 3018920 | 11/1981 | Fed. Rep. of Germany . |
| 3317487 | 11/1984 | Fed. Rep. of Germany . |

OTHER PUBLICATIONS

Article entitled "Hydraulikzylinder mit integrieter Verriegelung", from Der Konstrukteur of Jun. 1985, p. 65. "Hydraulik", from Fluid, of Jan. 1984, p. 34.

Primary Examiner—Robert E. Garrett
Assistant Examiner—Thomas E. Denion
Attorney, Agent, or Firm—W. G. Fasse; D. H. Kane, Jr.

[57] ABSTRACT

The present device is intended to lock a member, such as a tool, substantially without play into a form-locked position which can be released only by a fluid pressure intentionally applied to the device. The construction is such that small clamping strokes or displacements can be performed and so that the form-locking or arresting force is maintained as long as desired and with safety. For this purpose a pull rod having, for example, a ring channel, is insertable into a socket type of receiver equipped with radially movable locking elements which cooperate with their own slanted surfaces with slanted surfaces of the pull rod and with slanted surfaces of a ring piston. Certain cooperating surfaces have a slant angle which is smaller than a self-locking angle. The release is possible only if the ring piston is exposed to a fluid under pressure.

24 Claims, 5 Drawing Sheets

Fig 1

Fig 1a
VIEW X

Fig 5.
VIEW Z

PRESSURE ACTUATED AXIAL LOCKING

FIELD OF THE INVENTION

The invention relates to a pressure operated device for arresting an axially movable member such as a piston rod or a tool shaft in a determined position and for releasing the arrested member when a release is intended.

DESCRIPTION OF THE PRIOR ART

German Patent Publications (DE-OS) No. 2,911,071 and (DE-OS) No. 3,018,920 describe such pressure operable devices comprising a cylinder housing, a piston slidably movable in the cylinder housing, and a pull rod mounted for displacement in the cylinder housing. Such devices are capable of mechanically arresting a rod, for example a piston rod, in a predetermined safe position. The piston rod has the required shape. However, these prior art devices are not capable of exerting an axially effective force component and to mechanically maintain such an axial force component.

Further, in many instances it is necessary to provide an axially effective mechanical force and to maintain such force, for example, to hold a tool shaft in a tool exchange magazine of a machine tool. Such tools, for example drill bits, must be held in a tool holder substantially without play in the axial direction. The desired position must even be maintained when, for example, electrical or hydraulic actuating means fail, e.g. when there is a power failure.

OBJECTS OF THE INVENTION

In view of the foregoing it is the aim of the invention to achieve the following objects singly or in combination:

to provide a pressure actuated device capable of mechanically holding a pull rod safely against displacement in the axial direction;

such a device shall also be capable to axially move the pull rod at least by a small axial distance; and to make sure that the locked condition can be maintained even if the hydraulic or pneumatic power fails.

SUMMARY OF THE INVENTION

The pressure operated device according to the invention has a hollow cylinder housing with a longitudinal central axis and a piston slidably movable in the hollow cylinder housing back and forth in the direction of the longitudinal central axis. A pull rod is arranged for displacement in the hollow cylinder housing. The device is characterized in that the piston has at least one first surface area at least a surface portion of which extends longitudinally at an angle relative to the central axis. This angle is smaller than a so-called self-locking angle. At least one radially movable locking element is arranged for cooperation with the first surface area of the piston and with a second slanted surface area of the pull rod for locking and releasing the pull rod. The first surface area of the piston faces substantially radially inwardly. The second surface area of the pull rod faces approximately radially outwardly. Axially effective support means bear against the locking element or elements in a direction opposite to an axial locking or cocking movement. This combination of elements and their cooperation makes sure that a cocking or locking movement of the piston drives the locking element or elements radially inwardly by the sliding movement of the first surface area of the piston along a respective surface area of the locking element or elements. As a result, the respective counter surface or second surface of the pull rod which cooperates with the locking element or elements causes an axial movement of the pull rod. This axial movement of the pull rod continues until a portion of the pull rod or an element secured to the pull rod comes to bear against a stop, for example. Once the pull rod contacts the stop a further axial movement of the pull rod is not possible. However, the axially effective pulling force is being maintained. Due to the feature that the slanting angle of the effective first surface area of the piston is smaller than the so-called self-locking angle, it is assured, that the pull rod is locked without any further force application to the piston in the axial direction. The piston retains its position and therefore the locking force is also maintained. As a result, an absolutely safe mechanical locking of the pull rod is obtained.

Other advantages of the invention are seen in that the cooperating elements are so arranged that the device can be operated by simply inserting the pull rod. If desired, the pull rod could pass axially through the entire device so that operation of the device could be accomplished by either pulling or pushing the so-called pull rod. When the pressure supply should fail, the locking or cocking force is maintained as will be described in more detail below. Another advantage is seen in that the pull rod may be completely removed and exchanged if desired. The structural components of the invention as such are conventional machine elements readily available on the market. Substantial cocking and holding forces can be exerted by the present device and different pull-in speeds of the pull rod may be obtained. Another advantage is seen in that simple means make it possible to limit the pull-in force as well as the pull-in stroke of the pull rod. The present device can be coupled or combined with a piston cylinder unit having a double piston rod, whereby the combination is suitable for performing locking movements, for example, for locking an injection molding tool for synthetic material. When the mold is closed, the second portion of the double piston rod may be gripped by the apparatus according to the invention, thereby forming the pull rod of the present invention. As a result, a continuous locking force having the desired magnitude can be accomplished.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
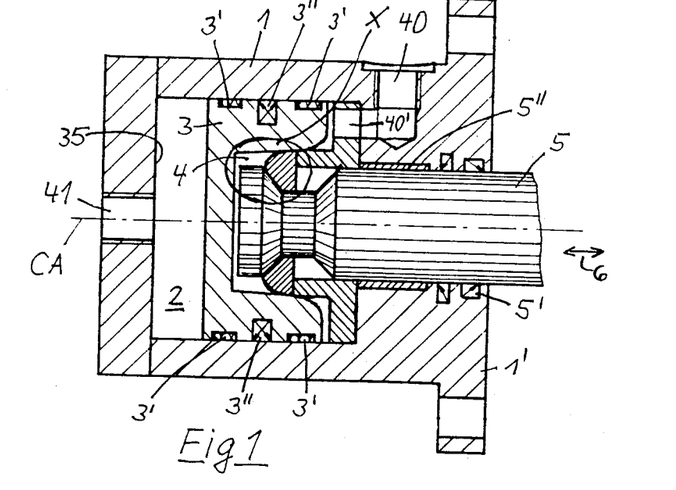
FIG. 1 is a longitudinal sectional view through one embodiment of the invention with the device shown in the locked condition.
Figure 1A:
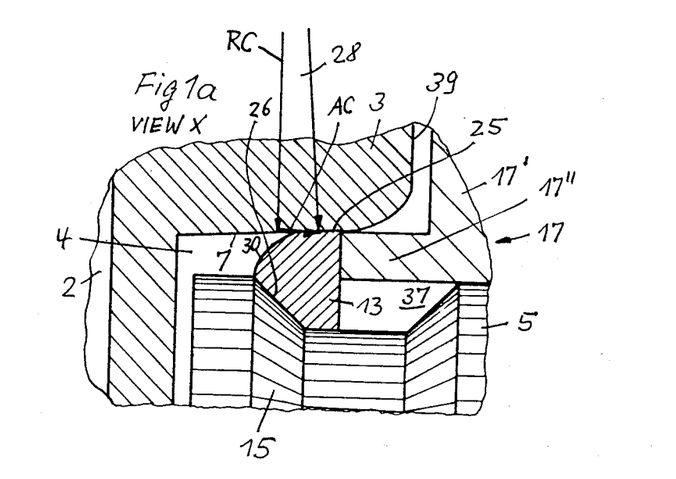
FIG. 1a shows, on an enlarged scale, a detail marked by a circle X in FIG. 1.

Referring to FIGS. 1 and 1a showing the apparatus in the pull rod locking condition, a hollow cylinder housing 1 is closed by a cover 1'. The cylinder 1 forms a cavity 2 with a bottom 35. The housing 1 has a central longitudinal axis CA. A piston 3 is slidably movable in the cavity 2 of the hollow cylinder housing 1. Conventional seals 3' and a conventional sliding ring 3" are inserted between the piston 3 and the inner wall surface of the cavity 2. The piston 3 has a cavity 4 into which a pull rod 5 passing through the cover 1' reaches. Sealing rings 5' and a guide bushing 5" are inserted between the cover 1' and the pull rod 5 which is movable back and forth in the direction of the arrow 6 and coaxially with the central axis CA when the pull rod 5 is not locked, as will be described.

Figure 1B:
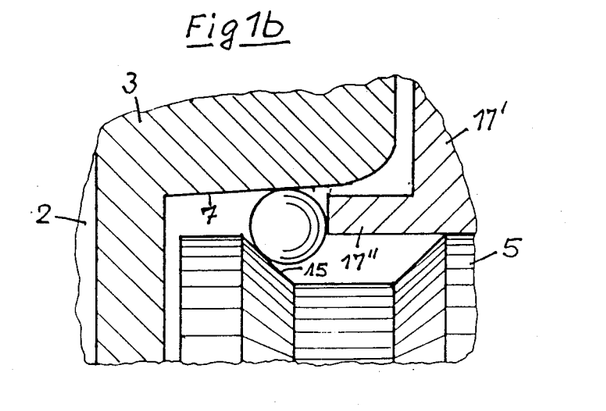
FIG. 1b is a detailed view similar to FIG. 1a, but showing locking elements in the form of spheres rather than in the form of ring segments shown in FIG. 1.

The cavity 4 in the piston 3 has a radially inwardly facing first surface 7 which is slightly slanted relative to the central axis CA. The inner end or left-hand end of the pull rod 5 has a ring groove 37 bounded by at least one slanted surface 15 forming a second surface facing approximately radially outwardly relative to the longitudinal central axis CA. Due to the slanting of the surface 15 it forms the jacket of a conical frustum. Radially movable locking means, for example, in the form of ring segments 13 are provided with surface portions for cooperation with the first slanted surface 7 of the piston 3 and with the second slanted surface 15 of the ring groove 37 of the pull rod 5. Thus, the slanted surface portion 26 of the ring segment 13 cooperates with the slanted surface portion 15 of the ring channel 37 of the pull rod 5. The surface portions 25 and 30 of the ring segments 13 cooperate with the slanted surface 7 of the piston 3. The slanting angle of these cooperating surfaces is so dimensioned that a movement of the pull rod 5 in the direction of the arrow 9 causes a radial movement of the ring segment or segments 13. However, these ring segments 13 may also be shaped as spheres as shown in FIG. 1b, whereby the operation remains the same.

As best seen in FIG. 1a, axial movement of the ring segments 13 is limited by a flange member 17 having a radially extending portion 17' and an axially extending portion 17". The cover 1' bears against the flange member 17 since the cover 1' is conventionally secured to the hollow cylinder housing 1. The axially extending portion 17" forms a ring member and its axial length functions as a spacer member which bears with its free end against a radially extending surface of the ring segment 13 or the balls as shown in FIG. 1b. The diameter of the spacer ring portion 17" is so dimensioned that it does not project radially outwardly of the ring segment or segments when these segments are in the radially innermost position as shown in FIG. 1a.

Figure 2:
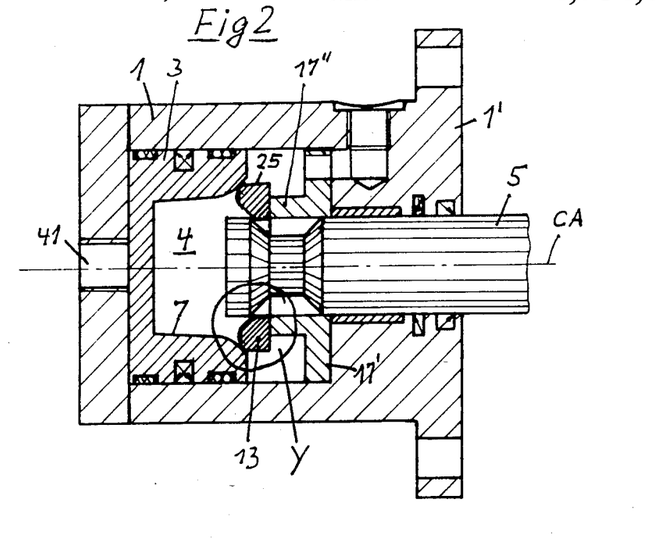
FIG. 2 is a sectional view similar to that of FIG. 1, but showing the device in the unlocked condition.
Figure 2A:
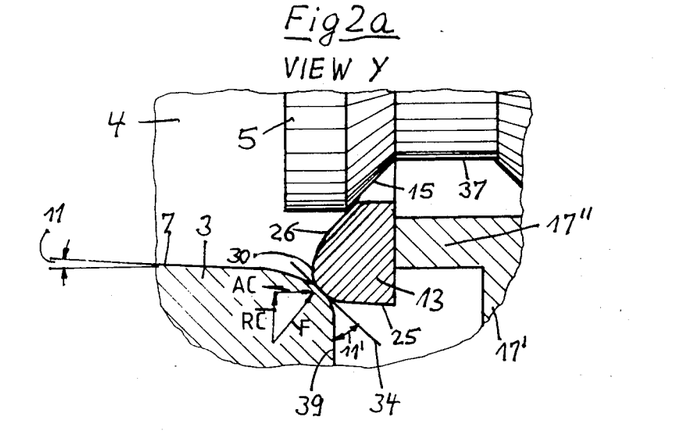
FIG. 2a shows, on an enlarged scale, a detail marked by a circle Y in FIG. 2.

The above mentioned slanted surface 7 surrounding the cavity 4 in the piston 3 has a slant angle 11 as shown in FIG. 2a. This slant angle 11 is defined between the slanting surface 7 and a line extending in parallel to the central axis CA as best seen in FIG. 2a. This angle 11 is smaller than the so-called self-locking angle. The angle 11 increases toward the axially outwardly facing end face 39 of the piston 3 so that the surface 7 has a hyperbolic type curvature. As mentioned above, the ring segment 13 also has two approximately outwardly facing surface portions 25 and 30, whereby the slanting angle of the surface portion 25 corresponds to that of the slant angle 11 and whereby the slanting angle of the surface portion 30 also increases so that the respective surface portions of the piston 3 and the ring segment or segments 13 are compatible with each other for the intended cooperation of moving the ring segments 13 into the locked position shown in FIG. 1 and FIG. 1a.

FIG. 2 the piston 3 has reached its left limit position when it rests against the bottom 35 of the hollow cylinder housing 3. If the piston 3 is in the position shown in FIGS. 2 and 2a, a pulling force applied to the piston rod 5 in the outward direction, to the right in FIG. 2, moves the elements 13 radially outwardly since the flange member 17 prevents an axial movement of the elements or ring segments 13. This is so even if the ring segments 13 should be spherical balls. The radially outward movement of the segments 13 is limited by the piston 3 which is, as shown in FIG. 2a, also in its limit position resting against the bottom of the cylinder 1. In this position the more pronounced slanting surface of the segment 13 rests against the hyperbolic type surface portion of the piston 3, whereby a further radial outward movement of the segment or segments 13 is stopped.

In this position, however, there is still a certain overlap between the slanted surface 15 of the pull rod 5 and the slanted surface 26 of the segments 13, whereby the pull rod 5 is prevented from moving further outwardly. Thus, the pull rod 5 cannot move further outwardly even if there is no further pressure applied to the piston 3. In this situation the tangent 34 through the point of contact between the piston 3 and the segment 13 encloses with the facing surface 39 of the piston 3 an angle 11' which is larger than the self-locking angle so that a movement of the piston 3 in the direction of the arrow 9, to the right in FIG. 2 will move the segments 13 radially inwardly. A self-locking cannot occur in this situation due to the just defined angular relationships.

The cylinder housing 3 is provided with at least one inlet bore 40 which extends through bores 40' in the radially extending flange portion 17' of the flange member 17 for admitting fluid under pressure into the cylinder housing 3 to move the piston 3 into the end position shown in FIG. 2. The inlet bores 40 are not shown in FIG. 2 for simplicity's sake. Another fluid flow inlet 41 is provided in the bottom of the cylinder 3 for admitting fluid under pressure into the chamber 2 to move the piston 3 into the position shown in FIG. 1. Both, the bores 40, 40' and the inlet 41 also function alternately as fluid flow outlets. Thus, when fluid under pressure is introduced through the bores 40, the inlet 41 functions as outlet and vice versa.

In operation, when the piston 3 is in the position shown in FIG. 2 fluid under pressure is admitted through inlet 41 to move the piston 3 to the right in FIG. 2, whereby a force is applied to the locking element or segments 13. A respective force triangle is shown in FIG. 2a. The force F effective on the elements 13 is divided into an axial component AC and into a radial component RC as shown in FIG. 2a. The radially effective component RC forces the locking element or segment 13 radially inwardly. The axial force component AC is taken up by the flange member 17 held in place by the cover 1' rigidly secured to the cylinder housing 1.

As a result of the radially inwardly directed movement of the segment 13 the surface 26 slides along the surface 15, thereby moving the pull rod 5 to the left in FIG. 2a, thereby pulling the pull rod 5 axially into the cavity 4 of the piston 3. This leftward movement of the pull rod 5 may for example, be used to pull a tool arranged in a tool magazine into an operating position, whereby the connection of the tool to the pull rod 5 is conventional and hence not shown. The leftward pulling force which is maintained even if the pressure through the inlet 41 on the piston 3 is released, makes sure that the pull rod 5 is held in place without any play until pressure is intentionally admitted through the bore 40, 40' for releasing the pull rod holding force.

As the piston 3 moves from the position shown in FIG. 2 into that shown in FIG. 1, the slanted surface 7 of the piston 3 comes into contact with the surface 25 of the segment 13. Since the slanting angle 11 of the surface 7 is smaller than the required self-locking angle, and since the slanting angle 28 of the surface 25 of the locking segment 13 is the same as the slanting angle 11 of the inner piston surface 7, there will be a self-locking. FIG. 1a shows the respective force angle showing the axial force component AC and the radial force component RC which is now substantially larger than in FIG. 2a, please compare FIG. 1a with FIG. 2a. Since the angle 28 corresponds to the angle 11 and since both angles are smaller than the self-locking angle, it is possible to relieve the piston 3 from any fluid pressure while still maintaining the locking segment or segments 13 in a locking position. Thus, even if there should be a power failure, the locked position of the pull rod 5 is maintained. Simultaneously, the piston rod 5 is mechanically arrested in its locked position. If the connection is to be released, a fluid under pressure is admitted through the bores 40, 40' to move the piston to the left, whereby fluid in the chamber 2 moves out through the inlet 41.

Figure 3:
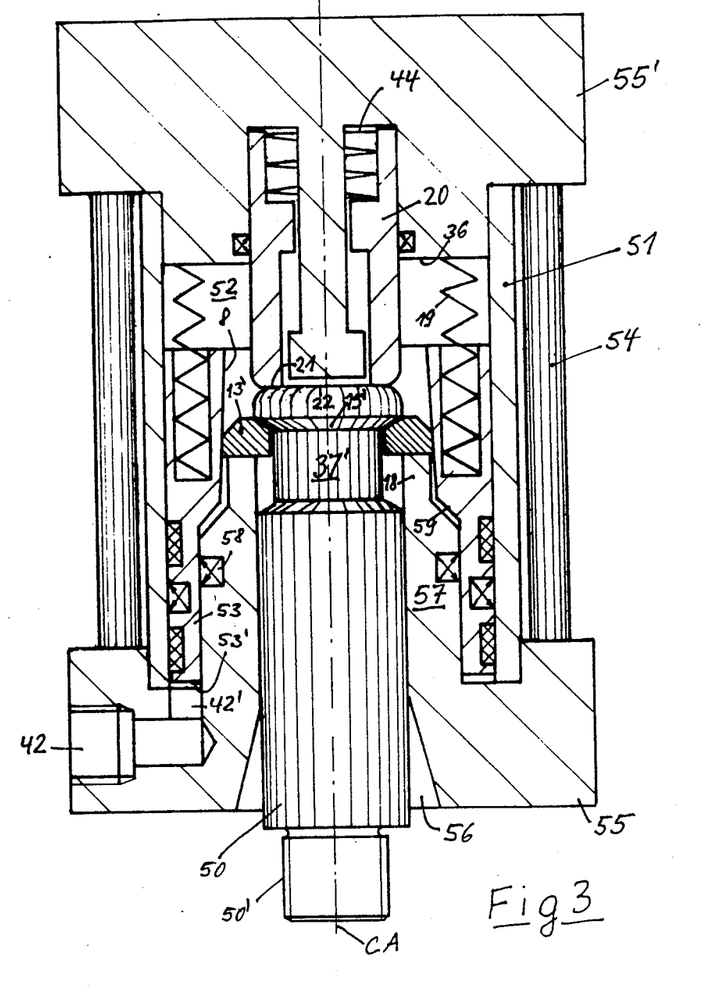
FIG. 3 is a longitudinal section through another embodiment of the invention with the device shown in the locked condition.
Figure 4:
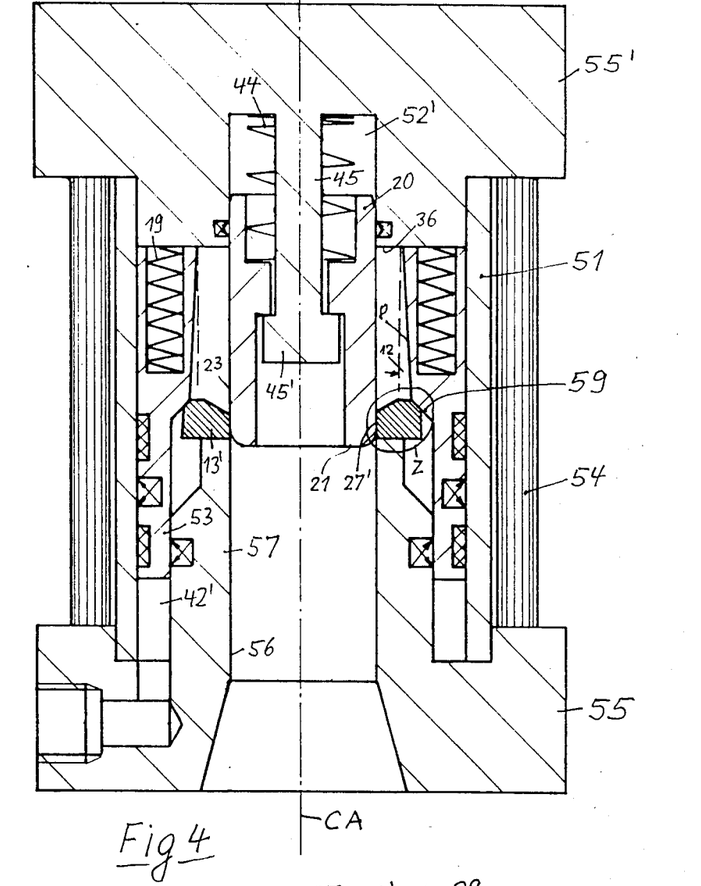
FIG. 4 is a longitudinal section through the embodiment of FIG. 3, but showing the device in the unlocked or released condition.
Figure 5:
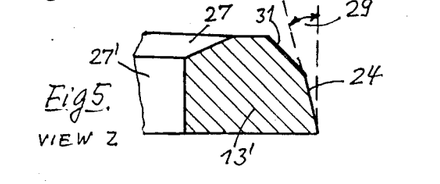
FIG. 5 is a detail, on an enlarged scale, marked by a circle Z in FIG. 4.

FIGS. 3, 4, and 5 illustrate another embodiment of the locking device according to the invention in which the pull rod 50 can be completely withdrawn if desired. Simply pushing the push rod into the device when the latter is in the position shown in FIG. 4, triggers the mechanism, whereby the pull rod is pulled into the locking position to the extent permitted by the dimensions of the structural component so that after insertion the pull-in force is maintained.

The embodiment of FIGS. 3 and 4 also comprise a hollow cylinder housing 51 having a cavity 52 in which a modified piston member 53 is received. The piston 53 is vertically movable up and down coaxially to the central axis CA. The upward movement of the piston 53 requires a force to overcome the biasing force of the spring 19. This force is provided by a fluid under pressure passing through an inlet bore 42 and a passage 42' to the axially facing end 53' of the piston 53. Conventional seals and a slide ring are provided between the radially outer surface of the piston 53 and the radially inner surface of the cylinder housing 51. The cylinder housing 51 may comprise two covers 55, 55' held together by tie bars 54. However, the housing 51 may also be a single piece. In both instances, the cover 55 with a hole 56 for the pull rod 50 will close the cylinder housing 51. The cover 55 has an axial extension 57 with a free end portion 18 bearing axially against the radially movable ring segments 13'. Thus, the function of the free end 18 is the same as that of the flange member 17 in the first embodiment. Seals 58 are provided between the piston 53 and the axial extension 57 of the cover 55. The piston 53 is axially slidable up and down relative to the cylinder 51 and relative to the extension 57.

In the embodiment of FIGS. 3 and 4 the piston 53 is biased into the locking position by the spring 19 when no fluid pressure is present at the inlet bore 42. When fluid pressure is applied through the inlet bore 42 to the axially facing end surface 53' of the piston 53 the piston 53 moves axially upwardly, thereby permitting the radial outward movement of the ring segments 13' due to the slanting radially inwardly facing surface 8 of the piston 53. The slanting surface 8 encloses an angle 12 with a line extending in parallel to the central axis CA, please see FIG. 4. The spring 19 or several such springs rest against the bottom 36 of the cavity 52 in the cylinder housing 51. The lower end of the spring or springs 19 rests in a respective recess in the piston 53. Incidentally, the angle 12 is also smaller than the self-locking angle. Axially below the radially inwardly facing slanting surface 8 of the piston 53 there is a further piston surface 59 with a more pronounced slant extending radially outwardly. The slanting surface 59 merges into the cylindrical portion of the piston 53. This cylindrical piston portion is sealed by the seal 58 of the axial cover extension 57.

As mentioned, the pull rod 50 fits into the bore 56 and reaches with its upper end or with its inner end having a ring channel 37' into cooperation with the radially movable ring segments 13'. For this purpose the pull rod 50 also has a slanting surface 15' which is the equivalent of the slanting surface 15 in the first embodiment. In the locking position shown in FIG. 3 the ring segments 13' rest with their surface 27 against the slanting surface 15'. The slope of the surfaces 15' and 27 is the same. In other words, these slants correspond to each other. The locking segments 13' also have a radially inwardly facing surface 27' for cooperation with a sleeve 20 axially biased by a spring 44 as best seen in FIG. 4. The ring segments 13' further have a slanted surface 24 for cooperation with the slanted surface 8 of the piston 53 and a surface 31 slanting in a more pronounced manner than the surface 24. The surface 31 rests against the surface 59 of the piston 53 in the unlocked condition, please see FIG. 4. The surface 24 includes a slanting angle 29 with a line extending in parallel to the central axis CA as shown in FIG. 5. The angle 29 corresponds to the angle 12. The angles 12 and 29 are both smaller than the self-locking angle to assure the desired self-locking.

The above mentioned sleeve 20 is axially slidable in a ring cavity 52' of the cylinder 51. A stud 45 extends centrally in the ring cavity 52' and has an enlarged diameter head 45' for limiting the axial downward movement of the sleeve 20 under the force of the biasing spring 44. The biasing spring 44 makes sure that the downwardly facing surface 21 of the sleeve 20 will remain in contact with the upwardly facing end surface 22 of the inner end of the pull rod 50. Thus, the pull rod 50 is maintained in a play-free locked position as best seen in FIG. 3.

In the locked position of FIG. 3 the piston 53 is forced axially downwardly by the biasing spring or springs 19. This downward movement of the piston 53 displaced the ring segments 13' radially inwardly by the cooperation of the surfaces 31 of the locking segments 13' with the surface 59 of the piston 53. Once the surface 59 slips off the surface 31, the surfaces 24 and 8 begin to cooperate to further push the locking segments 13' radially inwardly until the locked position shown in FIG. 3 is reached.

In order to release the push rod 50 entirely out of its locked condition, a fluid under pressure is admitted into the inlet port 42 and its action on the facing surfaces 53' of the piston 53 pushes the piston 53 axially upwardly against the force of the biasing spring or springs 19. The upward movement of the piston 53 is limited or stopped when the upper end of the piston 53 comes to rest against the bottom or ceiling 36 of the cavity 52 in the cylinder 51. As a result, the ring segments 13' may move radially outwardly when the pull rod 50 is pulled axially downwardly due to the cooperation of the slanted surface 15' with the slanted surface 27. As the push rod 50 moves axially downwardly, the sleeve 20 under the force of the biasing spring 44 tends to follow the push rod axially downwardly, thereby assuming the position shown in FIG. 4 in which the surfaces 27' of the segments 13' rest on the cylindrical outer surface 23 of the sleeve 20 as best seen in FIG. 4. Thus, even if the pull rod 50 is completely withdrawn as shown in FIG. 4, the ring segments 13' are maintained in a defined position.

In the position shown in FIG. 4 the fluid pressure on the facing surfaces 53' of the piston 53 may be released. Yet, the piston 53 cannot move axially downwardly because the ring segments 13' are held in place by the sleeve 20. Thus, in this released position, or rather in this condition in which the pull rod 50 is released, the ring piston 53 is blocked or arrested. This condition is achieved under the force of the elastic elements or springs 44 which require a very small force for this purpose. As a result, it is easy or a small force is needed to move the sleeve 20 against the force of the spring 44 hen a pull rod 50 is inserted again. Accordingly, different pull rod 50 may be sequentially inserted into the present device as long as these elements have the inner end shaped as described and shown. As soon as a push rod pushes the sleeve 20 sufficiently axially upwardly, the segments 13' will move radially inwardly under the force of the springs 19 to lock the pull rod in place.

If the pull rod 50 should be a holding element for a tool that may, for example, be connected to the pull rod by a threaded socket engaging the threaded stud 50' of the pull rod 50, the tool would be pulled together with the pull rod 50 into the locked position shown in FIG. 3. This is accomplished by simply pushing the pull rod 50 slightly into the present device, whereby it is instantly pulled and locked into the fixed position without play and under the desired ballast. The inner end of the pull rod 50 is arrested in a mechanically form-locking manner and hence cannot be released unless the release pressure is applied to the facing surface 53' as described. Accordingly, the locking is independent of any external influences except for the release pressure that may intentionally be applied as described.

Although the invention has been described with reference to specific example embodiments, it will be appreciated, that it is intended to cover all modifications and equivalents within the scope of the appended claims.

What is claimed is:

1. A pressure actuated axial locking device having a central longitudinal axis, comprising a hollow cylinder, a hollow locking piston slidably movable in said hollow cylinder, means cooperating with said locking piston for performing an unlocking operation and a locking operation, said hollow locking piston comprising first surface means on a radially inward face of said hollow locking piston for a form-locking and unlocking operation, said first surface means extending at a first slanting angle relative to said central longitudinal axis, said first angle being smaller than a self-locking angle, rod means having a free rod end arranged for an axial displacement in said hollow locking piston, said rod means comprising form-locking means including second surface means next to said free rod end for a form-locking and unlocking of said free rod end, radially movably locking elements having third surface means arranged for cooperation with first and second surface means in a form-locking and unlocking operation, stop means arranged for permitting a radial movement of said radially movable locking elements but preventing an axis movement of said locking elements in the same direction as a form-locking motion of said hollow looking piston, whereby said stop means are effective in a direction opposite form-locking motion of said hollow locking piston, said means cooperating with said hollow locking piston comprising first means for urging said hollow locking piston and thus said radially movable locking elements into engagement with said second surface means at said free rod end for said form-locking, and second means for urging said hollow locking piston into an unlocking position when said first locking means are not effective.

2. The device of claim 1, wherein said first means for urging comprise elastic biasing means (19) for biasing said hollow locking piston in said hollow cylinder in said locking motion direction.

3. The device of claim 1, wherein said second means for urging comprise inlet means in said hollow cylinder for applying a fluid under pressure to said hollow locking piston for moving said hollow locking piston in an unlocking direction.

4. The device of claim 1, wherein said hollow locking piston is open at both ends.

5. The device of claim 4, further comprising sleeve means mounted for axial movement in said hollow cylinder and coaxially to said rod means, said sleeve means and said rod means each having an axially facing surface for cooperation between said sleeve means and said rod means, said sleeve means having an additional surface for supporting said radially movable locking elements, and biasing means in said hollow cylinder for biasing said sleeve means toward said rod means.

6. The device of claim 1, wherein said radially movable locking means comprise a plurality of disk shaped ring segments having preferably a circular circumference.

7. The device of claim 1, wherein said third surface means of said radially movable locking elements comprise circular ring segments each having radially outer surface areas cooperating with said first surface means of said piston means, said circular ring segments further having approximately radially inner surface areas cooperating with said second surface means of said form-locking means of said rod means.

8. The device of claim 7, wherein said radially outer surface areas of said locking means have a first surface portion of a small inclination relative to said central axis and a second surface portion with a larger inclination relative to said central axis and thus to an axial displacement direction of said rod means, said smaller inclination having an angle or slant angle which is smaller than a self-locking angle for assuring a desired self-locking.

9. The device of claim 1, wherein said first surface means of said piston means have an inclination which increases in the axial direction toward said rod means, whereby radial spacings of said first surface means from said central axis increase in a form-locking motion direction of said hollow locking piston.

10. The device of claim 9, wherein said first surface means comprise sectional lines having an approximately hyperbolic or a hyperbolic configuration.

11. The device of claim 1, wherein in each radially outer position of said locking elements a tangent through a point of contact between said first and third surface means encloses a second angle with a line vertical to said central axis, said second angle being larger than a self-locking angle, whereby an axial movement of said hollow locking piston permits a radial movement of said locking elements.

12. The device of claim 1, further comprising stroke limit stop means for limiting at least a full stroke-length of said hollow locking piston.

13. The device of claim 12, wherein said stroke limit stop means are so arranged that the stroke of said hollow locking piston is stopped in a position in which said radially movable locking elements in their radially outermost position still provide a partial overlap with a portion of said second surface means of said rod means for preventing withdrawal of said rod means.

14. The device of claim 13, wherein said stroke limit stop means are formed by a bottom of said hollow cylinder.

15. The device of claim 13, wherein said stroke limit stop means comprise adjustable stop means for said piston means.

16. The device of claim 1, wherein said first means for urging comprise elastic means (19) for biasing said hollow locking piston in the direction of a form-locking stroke, and wherein said second means for urging comprise fluid flow means in said hollow cylinder for applying a fluid under pressure to said hollow locking piston in the direction of a release stroke.

17. The device of claim 1, further comprising fluid flow means in said hollow cylinder for applying a fluid under pressure to said hollow locking piston in the direction of a form-locking stroke and in the opposite direction for a release stroke (FIG. 1).

18. The device of claim 1, further comprising fluid flow means in said hollow cylinder for applying a force to said hollow locking piston for movement in one direction, and elastic biasing means for applying a force to said hollow locking piston for movement in the opposite direction.

19. The device of claim 1, wherein said form-locking means of said rod means comprise a ring channel, said second surface means of said rod means forming part of said ring channel.

20. The device of claim 1, wherein said radially movable locking elements are a plurality of spheres.

21. A pressure actuated axial locking device having a central longitudinal axis, comprising a hollow cylinder (51), a hollow open ended locking piston (53) open at both ends and slidably movable in said hollow cylinder, means cooperating with said locking piston for performing an unlocking operation and a locking operation, said hollow locking piston comprising first surface means on a radially inward face of said hollow locking piston for a form-locking and unlocking operation, said first surface means extending at a first slanting angle relative to said central longitudinal axis, said first angle being smaller than a self-locking angle, rod means having a free rod end arranged for an axial displacement in said hollow locking piston, said rod means comprising form-locking means including second surface means next to said free rod end for a form-locking and unlocking of said free rod end, radially movable locking elements having third surface means arranged for cooperation with said first and second surface means in a form-locking and unlocking operation, stop means arranged for permitting a radical movement of said radially movable locking elements but preventing an axial movement of said locking elements in the same direction as a form-locking motion of said hollow locking piston, whereby said stop means are effective in a direction opposite to said form-locking motion of said hollow locking piston, said means cooperating with said hollow locking piston comprising first means (19) for urging said hollow locking piton and thus said radially movable locking elements into engagement with said second surface means at said free rod end for form-locking said free rod end in said hollow locking, piston against axial withdrawal, and second means (42, 53') for urging said hollow locking piston into an unlocking position when said first locking means are not effective, said locking device further comprising a sleeve (20) mounted for axial movement in said hollow cylinder (51) and coaxially to said rod means, said sleeve (20) and said free rod end of said rod means each having an axially facing surface (21, 22) for cooperation between said sleeve and said free rod end, said sleeve (20) having an additional circumferential surface (23) for supporting said radially movable locking elements (13'), and biasing means (44) in said hollow cylinder for biasing said sleeve (20) toward said rod means (50), whereby said sleeve (20) in cooperation with said biasing means (44) reaches into said hollow open ended locking piston for holding said free rod end against further axial movement when said free rod end is in a form-locked position, and whereby said sleeve (20) holds said locking elements in a radially outer position when said rod means is completely withdrawn from said locking device.

22. The device of claim 21, wherein said radially movable locking means comprise a plurality of disk shaped ring segments having preferably a circular circumference.

23. The device of claim 21, wherein said second means for urging said hollow locking piston into an unlocking position, comprise inlet means in said hollow cylinder for applying a fluid under pressure to said hollow locking piston (53) for moving said hollow locking piston in an unlocking direction.

24. The device of claim 21, wherein said first means for urging comprise elastic means (19) for biasing said locking piston in the direction of a form-locking stroke.

* * * * *

UNITED STATES PATENT AND TRADEMARK OFFICE
CERTIFICATE OF CORRECTION

PATENT NO. : 4,784,044

DATED : November 15, 1988

INVENTOR(S) : Klaus-Dieter Klement

It is certified that error appears in the above-identified patent and that said Letters Patent is hereby corrected as shown below:

<u>In the Cover Sheet</u>: "[54]" should read: --PRESSURE ACTUATED AXIAL LOCKING DEVICE--.

<u>In the Specification</u>:

Column 4, line 15, "housing 3" should be --housing 1--;
           line 44, "housing 3" should be --housing 1--;
           line 48, "housing 3" should be --housing 1--, before "end" insert --unlocked--;
           line 49, replace "bores 40 are" by --bore 40 is--;
           line 50, replace "Fig. 2" by --Figs. 1a and 1b--.

line 51, replace "cylinder 3" by --cylinder 1--;
           line 53, replace "position" by --locked position--.

Column 5, line 42, replace "in which" by --from which--;
           line 44, replace "push" by --pull--;
           line 52, replace "piston member" by --locking piston--.

Column 6, line 10, after "53" insert --,--;
           line 63, before "piston" insert --locking--.

Column 7, line 5, replace "push" by --pull--;
           line 39, replace "push" by --pull--;
           line 40, after "rod" insert --50--;
           line 51, replace "ballast" by --bias--.

UNITED STATES PATENT AND TRADEMARK OFFICE
CERTIFICATE OF CORRECTION

PATENT NO. : 4,784,044
DATED : November 15, 1988
INVENTOR(S) : Klaus-Dieter Klement It is certified that error appears in the above-identified patent and that said Letters Patent is hereby corrected as shown below:

In the Claims:

Claim 1, Column 8, line 16, replace "axis" by --axial--;
line 18, replace "looking" by --locking--;
line 20, before "form-locking" insert --to said--.

Claim 6, Column 8, line 50, replace "means" by --elements--.

Claim 7, Column 8, line 57, replace "piston means" by --hollow locking piston--.

Claim 8, Column 8, line 62, replace "means" by --elements--.

Claim 9, Column 9, line 2, replace "piston means" by --hollow locking piston--.

Claim 15, Column 9, line 33, replace "piston means" by --hollow locking piston--.

Claim 21, Column 10, line 16, replace "radical" by --radial--;
line 24, replace "piton" by --piston--;
line 27, after "locking" delete ",".

Claim 22, Column 10, line 50, replace "means" by --elements--.

Signed and Sealed this

Fourth Day of April, 1989

Attest:

DONALD J. QUIGG

Attesting Officer   Commissioner of Patents and Trademarks